May 17, 1949. C. M. WAKEMAN 2,470,383
DEVICE FOR STABILIZING TRAILERS
Filed Dec. 28, 1945
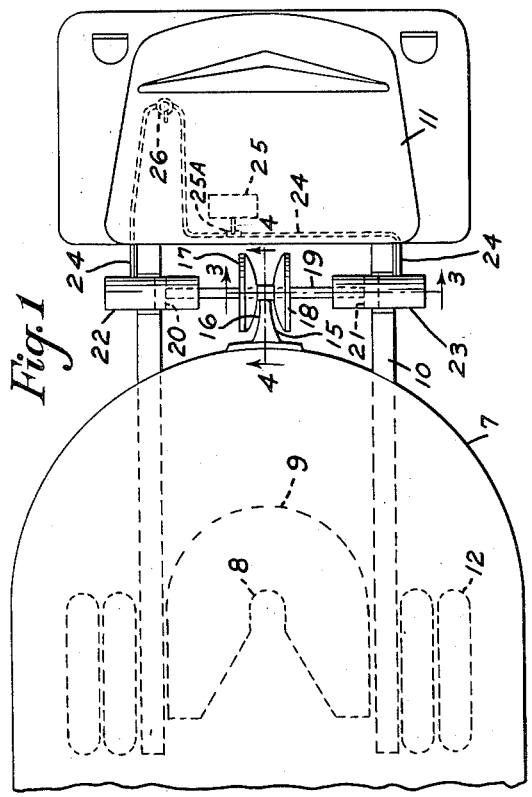
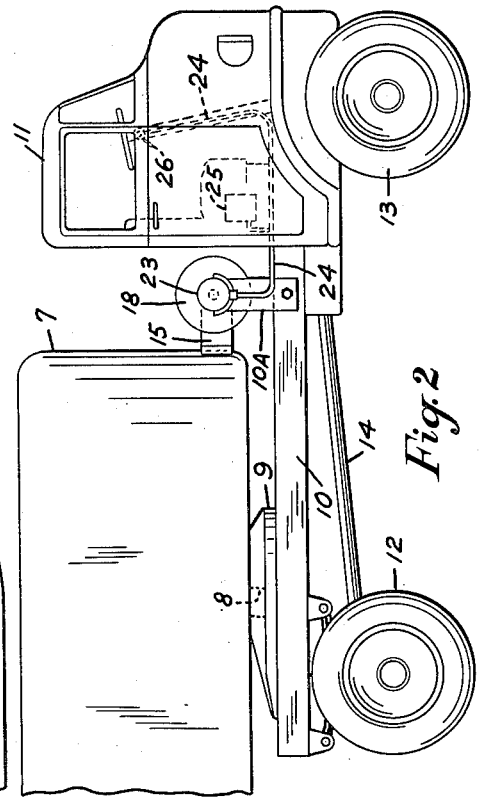
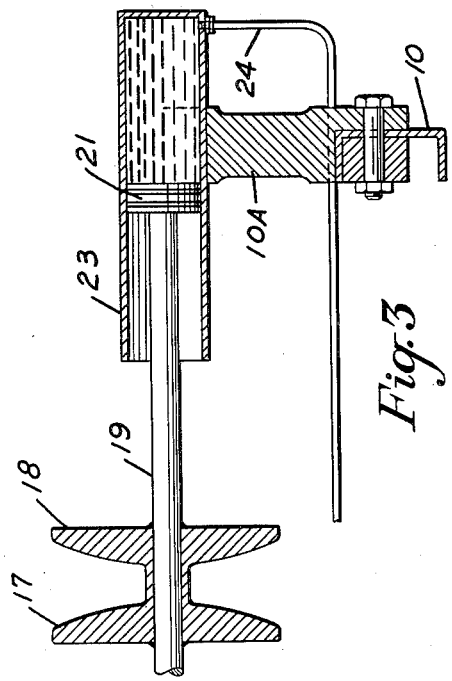
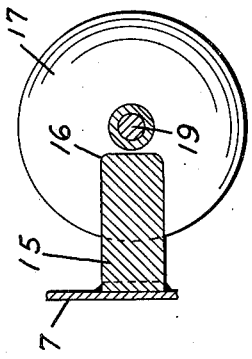
INVENTOR
CLIFFORD M. WAKEMAN
BY Edward M. Apple
ATTORNEY Patented May 17, 1949

2,470,383

UNITED STATES PATENT OFFICE 2,470,383

DEVICE FOR STABILIZING TRAILERS

Clifford M. Wakeman, Flint, Mich.

Application December 28, 1945, Serial No. 637,644

7 Claims. (Cl. 280—33.05)

This invention relates to automotive devices, and particularly to a device for preventing the so-called "jack-knifing" of a commercial trailer when hitched to a tractor or the like.

Many serious accidents occur in commercial hauling on the highways by what is known in the trade as "jack-knifing." That term is applied to the tendency of a trailer to pivot about the fifth wheel pin of the tractor. The "jack-knife" action often occurs when the brakes of the tractor are applied without applying the trailer brakes. It also results when the vehicles are climbing a slippery hill and back slip, and it may occur any time when one of the vehicles tries to overrun the other.

It is, therefore, an object of this invention to stabilize the vehicles, and keep them in alignment.

It is also an object of the invention to provide a mechanism for the purpose stated, which is readily controlled from the driver's cab, so that different effects may be accomplished, and different degrees of counter-action may be inaugurated.

Another object of the invention is the provision of a device of the character indicated, which is simple in construction, economical to manufacture and install, and highly efficient in operation.

Another object of the invention is to provide an anti "jack-knifing" device, which is fully automatic in its action, yet controllable in its resulting effectiveness, and one which does not require permanent connections between the trailer and the tractor.

The foregoing and other objects and advantages of the invention will appear as the description proceeds, reference being made from time to time to the accompanying drawings forming part of the within disclosure, in which drawings:

Fig. 1 is a plan view, with parts broken away, of a trailer and tractor equipped with my device.

Fig. 2 is a side elevational view of the mechanism illustrated in Fig. 1.

Fig. 3 is a sectional view taken substantially on the line 3—3 of Fig. 1.

Fig. 4 is a section taken on the line 4—4 of Fig. 1.

Referring now more particularly to the drawings, it will be understood that in the embodiment herein disclosed, the reference character 7 indicates the front end of a commercial trailer, pivoted as at 8 to the fifth wheel 9 of a tractor 10, which has a driver's cab 11, wheels 12 and 13 and drive shaft 14.

Mounted to the leading surface of the trailer 7 is a bracket 15, which is made of sufficient strength to withstand considerable side thrust. The free end 16 of the bracket 15 rests between a pair of convex discs 17 and 18, which are securely mounted on the shaft 19, which connects at either end to the pistons 20 and 21, slidably mounted in the hydraulic cylinders 22 and 23, which are secured by any suitable means as brackets 10A to opposite sides of the tractor 10.

The cylinders 22 and 23 are connected ahead of the pistons 20 and 21, to a hydraulic line 24, in which is interposed a fluid reservoir 25, a one-way valve 25A, and control valve 26, the latter preferably being positioned in the driver's cab 11, within easy reach of the driver. The one-way valve 25A permits fluid from the reservoir 25 to enter the line 24 in the event the fluid level in the line 24 becomes lowered for any reason.

The valve 26 is intended to control the flow of the fluid through the line 24 from the cylinder 22 to the cylinder 23, and vice versa. When the valve is open, the fluid will flow back and forth freely, but when it is partly closed, the flow of the liquid from one cylinder to the other is impeded, so that any force imposed on either piston 20 or 21, by the movement of the bracket 15, may be cushioned or completely counter-acted, with the result that the radial movement of the front end of the trailer 7 is completely stopped or effectively controlled to the desired degree.

Although I have disclosed herein a certain embodiment of the invention, it will be understood that with slight modifications, the device may be made to operate on almost any kind of vehicle of this nature.

Having described my invention, what I claim and desire to secure by Letters Patent is:

1. In a device of the character described, including a trailer and a tractor, the combination of a bracket secured to the front end of the trailer, hydraulic cylinders on said tractor oppositely disposed with respect to said bracket, pistons in said cylinders, a shaft connecting said pistons, and means on said shaft for contacting opposite sides of said bracket.

2. The combination defined in claim 1, in which said cylinders are connected to a common hydraulic line, there being a valve in said line between said cylinders for controlling the flow of fluid in said line.

3. The combination defined in claim 1, in which said cylinders are connected to a common hydraulic line, there being a valve in said line for controlling the flow of fluid in said line, and a fluid reservoir for maintaining a certain fluid level in said line, and a one-way valve between said reservoir and said line.

4. The combination defined in claim 1, in which said last-named means include a pair of convex disc-like members.

5. The combination defined in claim 1, in which the contacting surfaces between said bracket and said last-named means are curved.

6. In a device of the character described, including a towed and a towing vehicle, the combination of a bracket on the front end of the towed vehicle, oppositely disposed hydraulic cylinders secured to said towing vehicle, a fluid line connecting the outer ends of said cylinders, a control valve in said line, pistons in said cylinders, means connecting said pistons, and curved means on said last-named means for contacting opposite sides of said bracket.

7. The combination defined in claim 6, including a fluid reservoir having a one-way connection to said fluid line.

CLIFFORD M. WAKEMAN.

REFERENCES CITED

The following references are of record in the file of this patent:

UNITED STATES PATENTS

| Number | Name | Date |
|---|---|---|
| 903,884 | Przygode | Nov. 17, 1908 |